(12) United States Patent
Wall et al.

(10) Patent No.: US 8,254,275 B2
(45) Date of Patent: Aug. 28, 2012

(54) SERVICE MANAGEMENT SYSTEM FOR A TELECOMMUNICATIONS NETWORK (75) Inventors: Richard L. Wall, Broomfield, CO (US);
Gary L. Ryczek, Denver, CO (US);
James A. Loukatos, Thornton, CO (US);
Alex J. Henes, Denver, CO (US);
Jeffrey L. Martin, Frederick, CO (US);
Brett P. Hollman, Louisville, CO (US);
Thomas G. Hoople, Highlands Ranch, CO (US); George T. Joseph, Denver, CO (US); Troy Kau, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 12/839,323

(22) Filed: Jul. 19, 2010

(65) Prior Publication Data
US 2010/0284307 A1 Nov. 11, 2010

Related U.S. Application Data (63) Continuation of application No. 11/745,361, filed on May 7, 2007, now Pat. No. 7,760,658, which is a continuation of application No. 10/057,041, filed on Jan. 25, 2002, now Pat. No. 7,251,221.

(51) Int. Cl.
*H04L 12/28* (2006.01)
*G06F 13/00* (2006.01)
(52) U.S. Cl. ......... 370/248; 370/252; 370/254; 710/104
(58) Field of Classification Search .................. 370/216, 370/217, 221, 225, 242, 248, 252, 254, 255; 710/104, 316
See application file for complete search history.

(56) References Cited

U.S. PATENT DOCUMENTS

| | | | |
|---|---|---|---|
| 5,337,352 | A | 8/1994 | Kobayashi et al. |
| 5,353,283 | A | 10/1994 | Tsuchiya |
| 5,402,478 | A | 3/1995 | Hluchyj et al. |
| 5,586,254 | A | 12/1996 | Kondo et al. |
| 5,596,719 | A | 1/1997 | Ramakrishnan et al. |

(Continued)

FOREIGN PATENT DOCUMENTS

EP 0568477 A2 11/1993

(Continued)

OTHER PUBLICATIONS

"Canada Examination Report dated Jul. 6, 2010,", counterpart Canadian Application No. 2,416,749, filed Jan. 21, 2003, 3 pgs.

(Continued)

*Primary Examiner* — Kerri Rose (57) ABSTRACT

A communication line is installed in a network by automating a design phase and a configuration phase for the service and by automating failure recovery in either of the phases. In the design phase, an optimal route for the communication line is found, and the network components are provisioned and assigned. If the assigned network components are not available or can not be validated, the components causing the failure are marked, and the design phase is retried without the marked components. After the design phase, the configuration phase begins. The circuit design is tested against actual network components. If the test is passed, the actual network is configured according to the circuit design and the circuit is activated. If there is a network component failure during the configuration phase, the good route elements in the design are released while the failed network components are marked. The design phase is retried.

7 Claims, 9 Drawing Sheets

U.S. PATENT DOCUMENTS

| | | | |
|---|---|---|---|
| 5,680,448 A | 10/1997 | Becker | |
| 5,809,282 A | 9/1998 | Cooper et al. | |
| 5,841,759 A | 11/1998 | Russ et al. | |
| 5,881,131 A | 3/1999 | Farris et al. | |
| 5,963,544 A | 10/1999 | Ding et al. | |
| 6,058,103 A | 5/2000 | Henderson et al. | |
| 6,061,332 A | 5/2000 | Branton et al. | |
| 6,134,671 A * | 10/2000 | Commerford et al. | 370/216 |
| 6,185,193 B1 | 2/2001 | Kawakami et al. | |
| 6,240,463 B1 | 5/2001 | Benmohamed et al. | |
| 6,262,974 B1 | 7/2001 | Chevalier et al. | |
| 6,301,244 B1 | 10/2001 | Huang et al. | |
| 6,366,581 B1 | 4/2002 | Jepsen | |
| 6,603,742 B1 | 8/2003 | Steele et al. | |
| 6,662,221 B1 | 12/2003 | Gonda et al. | |
| 6,681,232 B1 | 1/2004 | Sistanizadeh et al. | |
| 6,948,101 B2 | 9/2005 | Saito | |
| 7,146,000 B2 | 12/2006 | Hollman et al. | |
| 7,693,976 B2 * | 4/2010 | Perry et al. | 370/252 |
| 2002/0004390 A1 | 1/2002 | Cutaia et al. | |
| 2002/0004935 A1 | 1/2002 | Huotari et al. | |
| 2002/0143872 A1 | 10/2002 | Weiss et al. | |
| 2002/0165961 A1 * | 11/2002 | Everdell et al. | 370/469 |
| 2003/0202468 A1 | 10/2003 | Cain et al. | |
| 2004/0024862 A1 | 2/2004 | Wall et al. | |
| 2007/0091868 A1 | 4/2007 | Hollman et al. | |
| 2009/0323701 A1 | 12/2009 | Hollman et al. | |
| 2009/0323702 A1 | 12/2009 | Hollman et al. | |
| 2010/0020695 A1 | 1/2010 | Hollman et al. | |

FOREIGN PATENT DOCUMENTS

| | | |
|---|---|---|
| EP | 0926860 A2 | 6/1999 |
| EP | 1014627 A1 | 6/2000 |
| EP | 1263260 A1 | 12/2002 |
| WO | WO-98/18235 | 4/1998 |
| WO | WO-99/21336 | 4/1999 |
| WO | WO-01/86435 | 11/2001 |
| WO | WO-02/17569 | 2/2002 |
| WO | WO-02/19135 | 3/2002 |
| WO | WO-02/41578 | 5/2002 |

OTHER PUBLICATIONS

"U.S. Non-Final Office Action, U.S. Appl. No. 10/209,527,", filed Jul. 31, 2002, mailed by US Patent and Trademark Office (USPTO) May 9, 2008, 10 pages.

Canadian Examination Report, dated May 23, 2012, Application No. 2416749, 3 pgs.

* cited by examiner

SERVICE MANAGEMENT SYSTEM FOR A TELECOMMUNICATIONS NETWORK

CROSS-REFERENCE TO RELATED APPLICATIONS

The present invention is a continuation of and claims the benefit of and priority from U.S. patent application Ser. No. 11/745,361, filed May 7, 2007, now U.S. Pat. No. 7,760,658, which is a continuation of U.S. patent application Ser. No. 10/057,041, filed 25 Jan. 2002, now U.S. Pat. No. 7,251,221, the subject matter of which are hereby incorporated herein by reference by their entirety.

TECHNICAL FIELD

This invention relates to the automated installation of network service in a telecommunication network. More particularly the invention relates to automated performance of the sequential tasks necessary to deliver network service to a customer over a communication network.

BACKGROUND OF THE INVENTION

Modern communication networks have very large capacity, can provide real time delivery of information over diverse routes, but are highly complex in their design. Because of the complexity in the design and the many trade offs and choices for installation of a communication line through such a network, the installation of a communication line between two end points for a customer can take four to five months. The installation involves thousands of inter-related tasks and requires many choices to be made. Once the customer's request for service has been received, an optimal route must be found. All the network elements along the route must be available. Available elements must be connectable to make up the circuit design to deliver the private line. Right now there are most likely months between the time the customer places an order for network service and the time of actual delivery of that service. This delay results in customer dissatisfaction with the network provider, and also costs the network provider lost revenue during the interval of time a communication line is being installed.

To date, the tasks performed to install a private line have been performed manually with some few exceptions for portions of the tasks. For example, computing systems have been brought to bear on the problem of finding the optimal route. However, computing systems yield results only as good as the data they work with, and the actual field inventory often differs from the stored field inventory in the computing system. What is available in the computer records may not in fact be available in the field. Further, computing systems without adequate data about the network may be programmed to make assumptions in creating a route for installation of a private line. These assumptions may not be valid when it is time to connect network elements together to complete the communication circuit design. Finally, what appears to be a valid design on the engineer's drafting board may contain network elements in the field that are not consistent with the computer information or the engineer's information and therefore are not connectable.

Further, performance of these installation tasks often results in design trade-off choices that may affect the service to the customer and thus require repeated consultation with the customer as the communication line is built. The installation of a private line is like building a large structure and the design and configuration phases of the project can take months to perform.

It is with respect to these considerations and others that the present invention has been made.

SUMMARY OF THE INVENTION

In accordance with the present invention, the above and other problems are solved by automating a design phase and a configuration phase for the installation of the communication line and further by automating the recovery from a failure in any of the phases. In the design phase, an optimal route to satisfy the required capacity is found and the network elements are provisioned and assigned. If the assigned network elements are not available or can not be validated so that the design fails, the segments or ports causing the failure are marked, and the operation flow reverts back to retry the design phase without the marked segments or ports. After the design phase is successfully completed, the configuration phase begins. In the first part of configuration phase, the circuit design from end point to end point is tested against the actual network controlled by the network provider. If the test is passed, the actual network is configured according to the circuit design and the circuit is activated. If there is a network component failure during the configuration phase, the good route elements in the design are released while the failed network elements are marked. The design is purged from the system and the operational flow returns to retry the design phase. This automated operational flow repeats until a circuit design is found that may be validated and configured.

In another aspect of the invention, the operation of finding an optimal route within the design phase may contain a retry loop. The routing operation may find an optimal route without checking all network elements of the route. When the routing operation then checks a network element and the element does not have required functions, such as an appropriate port, the routing operation will mark the network element unavailable and retry finding an optimal route without the marked network element.

In another aspect of the invention, the failed segments, ports and network elements are recovered offline in a reconciliation process and returned to the asset inventory for the network.

The great advantage of this invention is that a communication line within the network may be designed and configured in a matter of minutes rather than months. Subsequently, if the customer's equipment is located at or near node locations of the network, the customer's communication line may be connected to the customer's equipment and providing service as soon as manual connection to the network occurs—usually a matter of hours or days rather than months.

These and various other features as well as advantages, which characterize the present invention, will be apparent from a reading of the following detailed description and a review of the associated drawings.

DETAILED DESCRIPTION PREFERRED EMBODIMENTS

Figure 1:
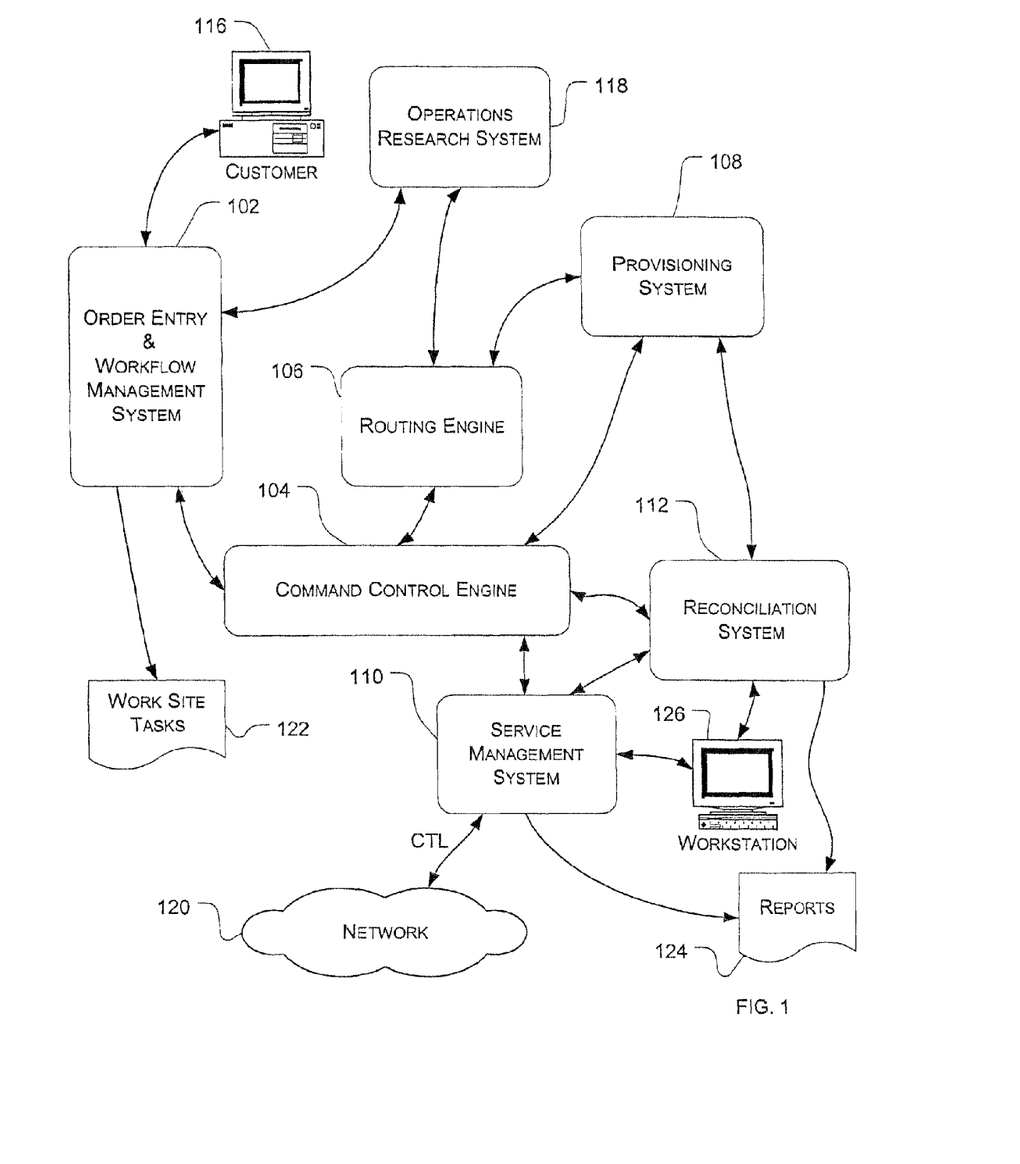
FIG. 1 shows one embodiment of a system for automatically installing communication lines in response to network service requests.

FIG. 1 shows the architecture of the automated installation system for delivering a private line to a customer with minimal delay. The system has an order entry and work flow management system 102, a command control engine 104, a routing engine 106, a provisioning system 108, and a service management system 110. Command control engine 104 integrates the operations performed by all of the other engines and systems to control the installation system operations.

The reconciliation system 112 adds flexible adjustment of the installation system to recover and work around problems arising during the automated delivery of the private line. The operations research system 118 provides performance and cost information to the order entry system 102 and network rules to the routing engine 106.

Order entry system 102 works with the customer through a remote computer 116 to take an order from the customer. Based on such information as capacity and availability as determined by the routing engine, the order entry system will conduct a dialog with the customer through the user interface at the remote computer 116. This real time dialog collects from the customer necessary information to design the line and provides real time feedback to the customer on availability and implementation installation dates.

The routing engine 106 receives commands from the control engine 104 to determine possible paths for the private line to be provided to the customer. The operations research system 118 provides network rules to the routing engine so that the routing engine may formulate a route for the private line. The operations research system 118 also provides cost and pricing information to the order entry system reflective of the rules being provided to the routing engine 106. Routing engine 106 under control of the command control engine returns information to the order entry system regarding the capacity of the system. The order entry system 102 can then reply to the customer in a real time basis whether the customer order can be accommodated.

One example of a routing engine is described in U.S. patent application Ser. No. 10/057,362 entitled "ROUTING ENGINE FOR TELECOMMUNICATIONS NETWORK," filed 25 Jan. 2002 (now U.S. Pat. No. 7,146,000). The specification and drawings of this application are incorporated herein as an exemplary routing engine for use in this installation system.

After the routing engine 106 has determined a proposed route then the command control engine engages the provisioning system 108 to provision and assign elements to the route. Provisioning system 108 also validates the design. If the route is validated then the route is provided to the service management system along with configuration information.

Service management system 110 then automatically configures the network 120 to create the private line from end to end in accordance with the customer order. Service management system 110 works with various network element-driving units to drive network elements in the network to connect and activate the private line. Once the private line is connected and activated in the network, the command control engine controls the workflow management system 102 to generate worksite task lists to complete the installation of a private line for the customer. In most instances all of the worksite tasks will be just those necessary at the end points to connect into the customers systems, but they could also include worksite tasks along the route.

A significant aspect of the installation system is that it is designed to automatically work around problems in implementing the private line. In addition the installation system implements a network element recovery operation using the reconciliation system 112 to recover network elements marked as bad or unavailable for some reason. When the command control engine detects a failure or error in installation operations—routing, provisioning and assigning, configuration and activation then the command control engine can call the reconciliation system 112. The reconciliation system 112 receives input and cooperates with the service management system 112 and provisioning system 108 to reconcile problems in links or segments between nodes or section at nodes in the network. Such problems might include erroneous indications of availability of a segment or port, erroneous connection of a segment to a port at a network element, and in general any port or segment issues that might arise. The reconciliation system 112 along with the service management system 110 generates reports 124 for designers and provides workstation access to the live network for the designers through workstation 126.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing systems implementing the invention. Accordingly, the logical operations making up the embodiments of the present invention described herein are referred to variously as operations, structural devices, steps, acts or modules. It will be recognized by one skilled in the art that these operations, structural devices, steps, acts and modules may be implemented in software, in firmware, in special purpose digital logic, and any combination thereof without deviating from the spirit and scope of the present invention as recited within the claims attached hereto.

Figure 2:
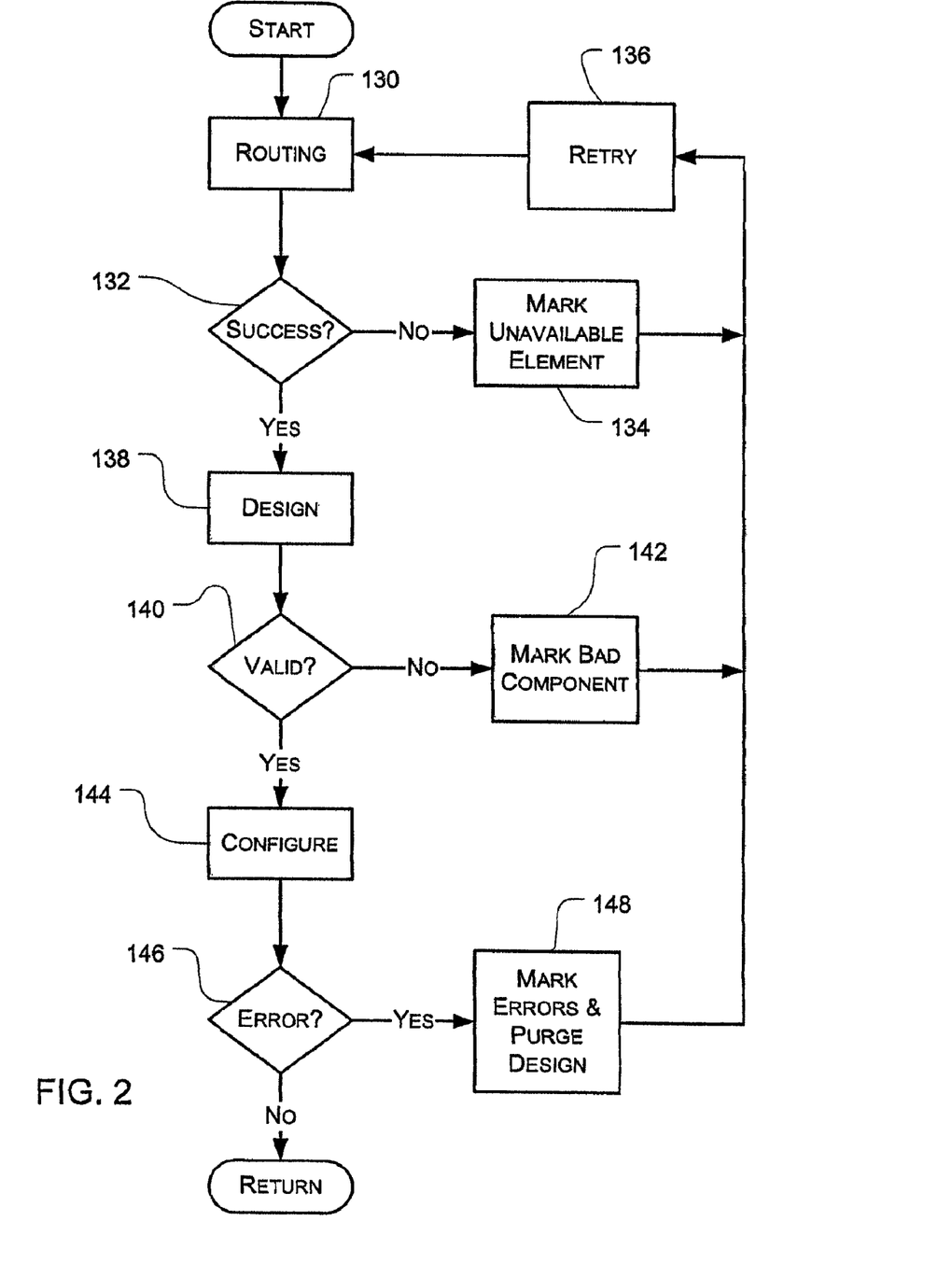
FIG. 2 illustrates one embodiment of the operations performed in installing a communication line with the system of FIG. 1.

FIG. 2 illustrates the operational flow for a preferred embodiment of the invention in installing a communication line in response to a network service request. After a request is received, routing module 130 will attempt to select a best route from a network asset inventory database. The asset database is an inventory of network elements in the network provider's network system. The asset database represents on paper what the network provider believes is available. Network elements are constantly being added to and withdrawn from the asset inventory database as designs for network service are added and purged, and as network elements are added or consumed. As the route is being selected, a given network element in the selected route may not have the correct properties and thus not truly be available. For example, the right type of port, high speed or low speed, may not be available, or a channel in the segment between network elements may not be available. In such an event availability test operation 132 will detect that the route is not available and the operational flow will branch NO to mark operation 134. Mark operation 134 marks the network element or segment that was not available, and the operation flow returns to retry operation 136. Retry operation 136 initiates the same service request again, the routing module 130 will find another route without using the network element and segments marked unavailable by mark operation 134.

If availability test operation 132 passes the route selected by routing module 132, the operation flow branches to design module 138. Design module 138 will create a circuit design from end point to end point to implement the network service. The resulting circuit design will go through a validity test at test operation 140. Validity test operation 140 is comparing all the components—network elements, ports, cross-connects, and segments—in the design against the asset inventory database. If the comparison finds a mismatch between the design and the information in the asset inventory, the operation flow branches NO to consume operation 142. Consume operation 142 marks the bad network components in the design as consumed and thus unavailable. Operation flow then returns to retry operation 136 which initiates another request for a route for the network service. Routing module 130 will start again to find a route and will not use network components marked consumed and unavailable.

If the circuit design passes the validity test, the operation flow branches YES to the configure module 144. Configure module configures and activates the network elements, ports, cross-connects and segments in the circuit design. Since the activation module is working with the actual network rather than the network as indicated in the asset inventory records, it is possible that the asset inventory is not up-to-date and configuration will fail. Also a network element, port, cross-connect or segment could fail when activated. Error test operation 146 tests the configuration and activation. If an error is detected, the operation flow branches YES to purge operation 148. Purge operation 148 releases good components back into the asset inventory. Bad components marked as consumed by the design are not released; otherwise, the circuit design is purged and the operation flow returns to retry operation 136. Retry operation will initiate the service request at routing module 130 and the installation operational flow begins again with the routing module looking for another route.

If no error is detected, the installation of the communication line to satisfy the service request is complete, and the operation flow returns to the main flow for other operations. What is significant about the operational flow is that it automates the installation of the network service and does not go offline when there is an error in routing, design or configuration. Instead the problem component is marked and the installation flow begins again without using the bad network component.

Figure 3:
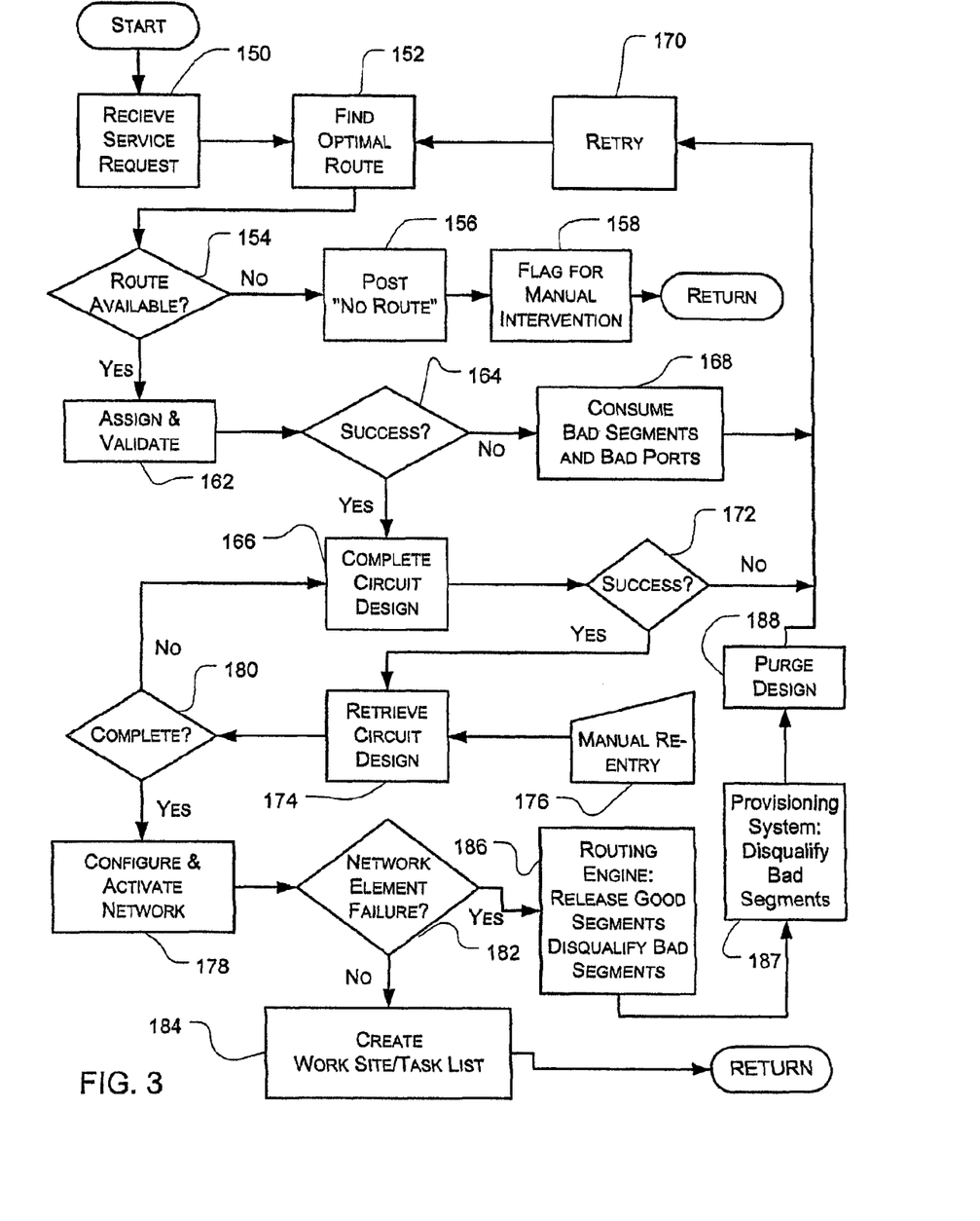
FIG. 3 illustrates another preferred embodiment of the operations performed in installing a private line in response to a customer request with the system of FIG. 1.

FIG. 3 shows another preferred embodiment of the operational flow for the installation of a private line. The automated process begins when the service request is received at the receive operation 150. The service request will include a source end point, a destination end point and properties associated with the type of service desired. This service request is passed to find optimal route module 152. The find module 152, which is in the routing engine 106 (FIG. 1), will apply the service request to possible routes generated from a network inventory data base. An optimal route satisfying the service request will be selected based on the Dijkstra algorithm. Other routing algorithms such as Bell/Ford algorithm, Johnson's algorithm and Floyd-Warshall algorithm could be used.

Route available test operation 154 detects whether the find optimal route module was successful in finding a route to satisfy the request. If the route is not available, then the operation flow branches NO to post operation 156. Post operation 156 will return a "no route" message in response to the service request. Notification operation 158 will flag the service request for manual intervention and the automated installation operation flow returns back to the main process flow in the computing system.

If the route is available, then the operation flow branches YES from test operation 154 to assign and validate operation 162. In the assign and validate operation 162 the command control engine 104 (FIG. 1) works with the provisioning system 108 (FIG. 1) to perform the assign and validate operation 162. Based on the route identified by the find optimal route module 152, the provisioning system assigns and validates network elements and connection segments in the route. Assigning a segment or network element is accomplished by marking the segment or port of a network element as consumed. If all of the segments and ports of network elements required for the route can be assigned and validated i.e. verified against an asset inventory of network elements in the provisioning system, success detect operation 164 will indicate the route components are assigned and validated. The operation flow will branch YES to complete circuit design module 166. If the assignment and validation operation 162 fails, then the success detect operation 164 will branch the operation flow NO to consume bad segments and bad ports operation 168. Operation 168 by consuming the bad segments and bad ports effectively marks these components—segments and ports—in the routing engine as unusable. After the segments and ports are so marked, the operation flow returns to retry operation 170. Retry operation 170 again applies the service request to the find optimal route module 152. Module 152 will again operate to find a route but this time the bad segments and bad ports marked consumed by consume operation 168 are not available for use in finding route. Accordingly, if find optimal route module 152 can find another optimal route, the new route will be passed by test operation 154 to assign and validate operation 162. This operations loop will continue until a route whose segments and ports of the network elements can be assigned and validated is found and successfully tested by the detect operation 164.

For routes that have been successfully assigned, the complete circuit module 166 completes and validates the design against the quality standards and generates logical ports which will be used in configuration and activation. The quality standards for the circuit design are based on rules that assure the design is feasible, has good performance and is cost effective. All network elements will be identified, all ports identified, all segments identified and all properties associated with each component or device in the circuit will be identified. Once the circuit a design is completed, design success test operation 172 tests whether the circuit design was completed and validated. Since the completed circuit module 166 has effectively approved all of the components of the circuit, any circuit design preceding down the path through complete circuit module 166 will be passed by the circuit design success test to retrieve circuit design operation 174.

Design success test 172 as will be discussed shortly is provided for the situation where manual design intervention has occurred.

Manual re-entry input 176 indicates manual intervention, if necessary, has been completed. The retrieve circuit design operation 174 retrieves the circuit design and passes that circuit design to the configure and activate network operation 178. The "complete" test operation 180 is provided because a circuit design where there is manual intervention may not be complete. In this situation the operation flow would branch NO back to complete circuit design 166. If the complete circuit design operation 166 can not complete the design, then the design success test operation 172 would detect the failure and branch NO back to retry operation 170. Retry operation 170 would then cause the find optimal route operation 152 to find another optimal route for the service request. Accordingly, the manual re-entry input operation 176, the complete test operation 180 and the design success test operation 172 are provided only because of the desire to be able to accommodate manual intervention in a design. If the system were only going to deal with automated designs, then the operation flow would be directly from complete circuit design operation 166 to retrieve circuit design operation 174 and to configure and activate network operation 178.

In the configure and activate network operation 178, the service management system 110 (FIG. 1) works under control of the command control engine 104 (FIG. 1) to communicate the configuration information to all of the network elements making up the circuit design for the line being installed. The configure operation performed by module 178 error tests the circuit design against the live network inventory. If no errors are found, it configures all of the network elements in the network to create the segments and port connections making up the private line. Once the network elements are configured so that the circuit exists for the private line, the circuit is activated and tested. Network element failure test operation 182 passes the operational flow to create operation 184 if there is no network element failure. On the other hand, if there is an error in the design or a network element failure, the operation flow passes to release operation 186. Release operation 186 releases all of the good segments and disqualifies all the bad segments for the route in the routing engine. Disqualify operation 187 disqualifies in the provisioning system all the bad segments from the route. Finally, purge operation 188 purges the entire design from the provisioning system. After the purge design operation 188, the operational flow returns to retry operation 170. Retry operation 170 signals the find optimal route module 152 to again begin looking for a route to provide a private line for the service request.

The create operation 184 when the network activation is successful is the last operation performed by the installation system. In this create operation 184 a work site task list is generated for all tasks that must be accomplished manually. Typically this will be just the final hookup or connection between the customer and the end point of the network provided by the network provider. However, there could be limited instances where for some reason the automated configuration and activation of the network did not fail but flagged the need for a manual intervention at a work site along the route. This could occur where a node has not been completely automated for control from the service management system 110 (FIG. 1). After the network has been activated to provide the line, and the task list has been generated, the operation flow exits from the installation routine and returns to the main computer system operation flow.

Figure 4:
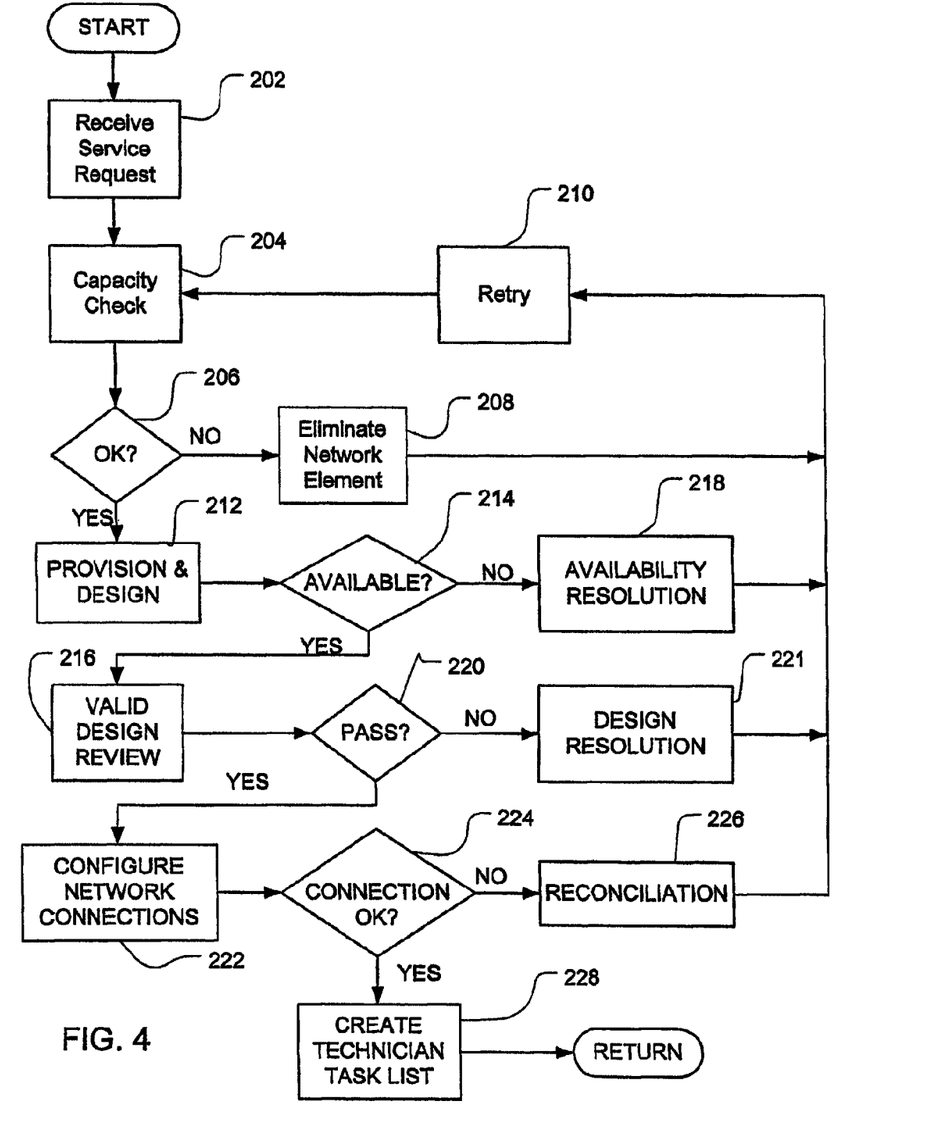
FIG. 4 shows another preferred embodiment of the operations performed in installing a communications line with the system of FIG. 1.

FIG. 4 illustrates another preferred embodiment of the invention where the installation operational flow is being performed in the installation system of FIG. 1. The operational flow begins with an order entry operation 202 that performs a dialog with the customer to establish the order or service request by the customer. Once the private line properties desired by the customer are specified in an order; a service request is passed to a capacity check operation 204. Capacity check operation 204 works in the routing engine 106 (FIG. 1) to evaluate whether the network has the capacity to meet the order. Test operation 206 tests whether the capacity check was satisfied. If it is not satisfied then the operation flow branches NO to eliminate operation 208.

Eliminate operation 208 removes from consideration for a route for the private line those network elements and other network components that are limiting the capacity. With these elements so marked, the operational flow passes to retry operation 210. Retry operation 210 initiates the capacity check operation 204 again so that the routing engine will again look to satisfy the capacity requested in the order by the customer. In this retry the limiting network elements that were a problem in the first try are not used. Once the routing engine has determined that a route is possible and meets the capacity requirements of the order, then test operation 206 will indicate the capacity test has passed. Operation flow then branches YES to the provisioning and designing operation 212.

The command control engine works with the provisioning system 108 (FIG. 1) to perform the provision and design operations. The provision and design operation 212 allocates resources to be used from an asset inventory database and designs the private line for the customers order. It further assigns point-to-point segments and network elements in the network based on routing information from routing engine 106 (FIG. 1). Once the route has been designed, availability test 214 is performed.

Availability test operation 214 reviews the network components assigned by the provision and design operation 212, and if all of the components are available, the operation flow branches YES to the design review operation 216. On the other hand if the components are not all available, then the operation flow branches NO. The operation flow branches NO to the availability resolution operation 218.

Availability resolution operation 218 seeks to provide alternative components for those identified as not available in the availability test. At the same time to expedite the process of meeting the order, the operation flow returns to retry 210. Retry operation 210 initiates a new capacity check 204 to begin the operational flow of satisfying the order all over again. The component, that was not available, is marked as unavailable as this new flow begins.

As discussed above when the network component required by the design is available, the operation flow branches to the valid design review operation 216. Valid design review 216 is comparing the design rules for the proposed design for the private line and the network component available in the network as indicated by a network asset inventory. If there is a mismatch at a network component or a design rule is not satisfied, the pass test operation 220 will fail. When the pass test operation 220 fails, the operation flow branches NO to the design resolution operation 221. Design resolution operation will seek to understand the design inconsistency. The operation will mark the design element as a problem and then pass the operation control back to retry operation 210. Again retry operation 210 notes the component that failed, as marked by the design review, and then initiates the operations again at the capacity check operation 204 so that the automated installation system may proceed to try another design.

On the other hand if the valid design review operation 216 finds no problems, and the pass test operation is successful, then the operation flow branches YES to configure network operation 222. In the configure network operation 222, the command control engine passes control to the service management system 110 (FIG. 1) so that the service management system can build the private line. This is done by configuring network elements, ports, cross-connects and segments in the network to provide the customer's private line from end point to end point. Connection test operation 224 then detects whether the configuration operation was successful; i.e. the connections for the private line have been made. If the connections are not OK, then the operation flow branches NO to reconciliation operation 226.

The connection reconciliation operation 226 is performed by the reconciliation system 112 (FIG. 1). The service management system will generate reports and provide electronic error information and the actual network inventory to the reconciliation system. The reconciliation system will attempt an automatic conflict fix. If this fails, troubleshooters may then use the workstation 126 (FIG. 1) to manually work with the reconciliation system to determine what error has caused the connection failure. In the meantime the reconciliation operation 126 marks the faulty component and passes operation flow back to retry operation 210. Retry operation 210 notes the component marked by the reconciliation operation and initiates a new try for the private line. The retry begins again at the capacity check operation 204.

Once a private line has been built and passes the connection test 224, the operation flow branches YES to create the technician task list in operation 228. The technician task list is created by the workflow management system 114. After the task list is completed, the operations for the installation system are complete. As soon as the technician has completed the few manual tasks for hook-up, the customer will be notified that the private line is activated and operational.

In effect the command control engine in this automatic, integrated delivery system keeps pushing the system for a real-time solution using the large amount of capacity and resources that are available through the network. This provides the advantage that a private line may be rapidly established and confirmed to the customer automatically so that all that remains is for a technician to service the end points of the private line to connect the customer.

Figure 5:
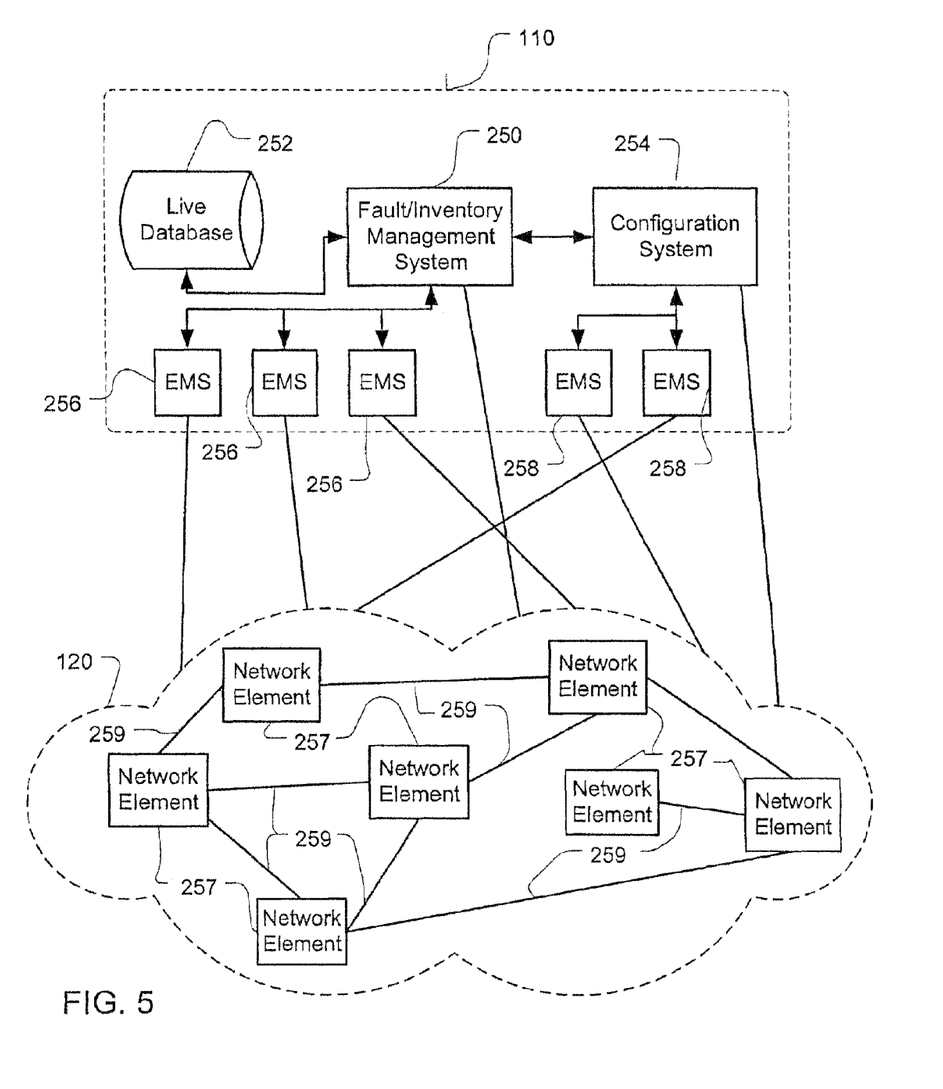
FIG. 5 illustrates the systems included in the service management system 110 of FIG. 1 and in addition a network monitored and configured by the service management system.

FIG. 5 illustrates the architecture of the service management system 110 of FIG. 1 and its control of the network elements to validate the actual network, and configure and activate the network based on a complete circuit design created by the installation operational flow in FIG. 2, 3 or 4. The service management system in the embodiment of FIG. 5 includes a fault/inventory management system 250 for validating the circuit design against the live or actual network, a live database 252 for storing the live network information and a configuration system 254 for configuring and activating the circuit design in the live network.

The fault/inventory system 250 can communicate either directly with network elements 257 and connection segments 259 or through element management systems 256. There will likely by a plurality of element management systems because of the plurality of types of network elements. Likewise the configuration system 254 can communicate either directly with network elements 257 and connection segments 259 or through element management systems 258. Communication to the network elements is provided through any number of communication links provided by the network provider and might be serial communication, internet protocol communication, order wire communication, etc. A network element includes ports and cross-connects between ports that can be made or not when configuring the network element. Ports may be low speed or high speed. Connection segments include two ports in to separate devices communicating via optical fiber or electrical cable. Whether the communication is direct or through an element management system depends upon the network elements used. Network elements and element management systems may be obtained from manufacturers such as Nortel, Alcatel, Fujitsu, Ciena and Ericsson.

The fault/inventory management system 250 is monitoring the live network and providing updated live network inventory data or records to the live database 252. The fault management system also validates the circuit design against the live or actual network as will be described hereinafter with reference to FIG. 6. The configuration system 254 configures and activates the network elements 257 and segment 259 as will be described hereinafter with reference to FIG. 6.

Figure 6:
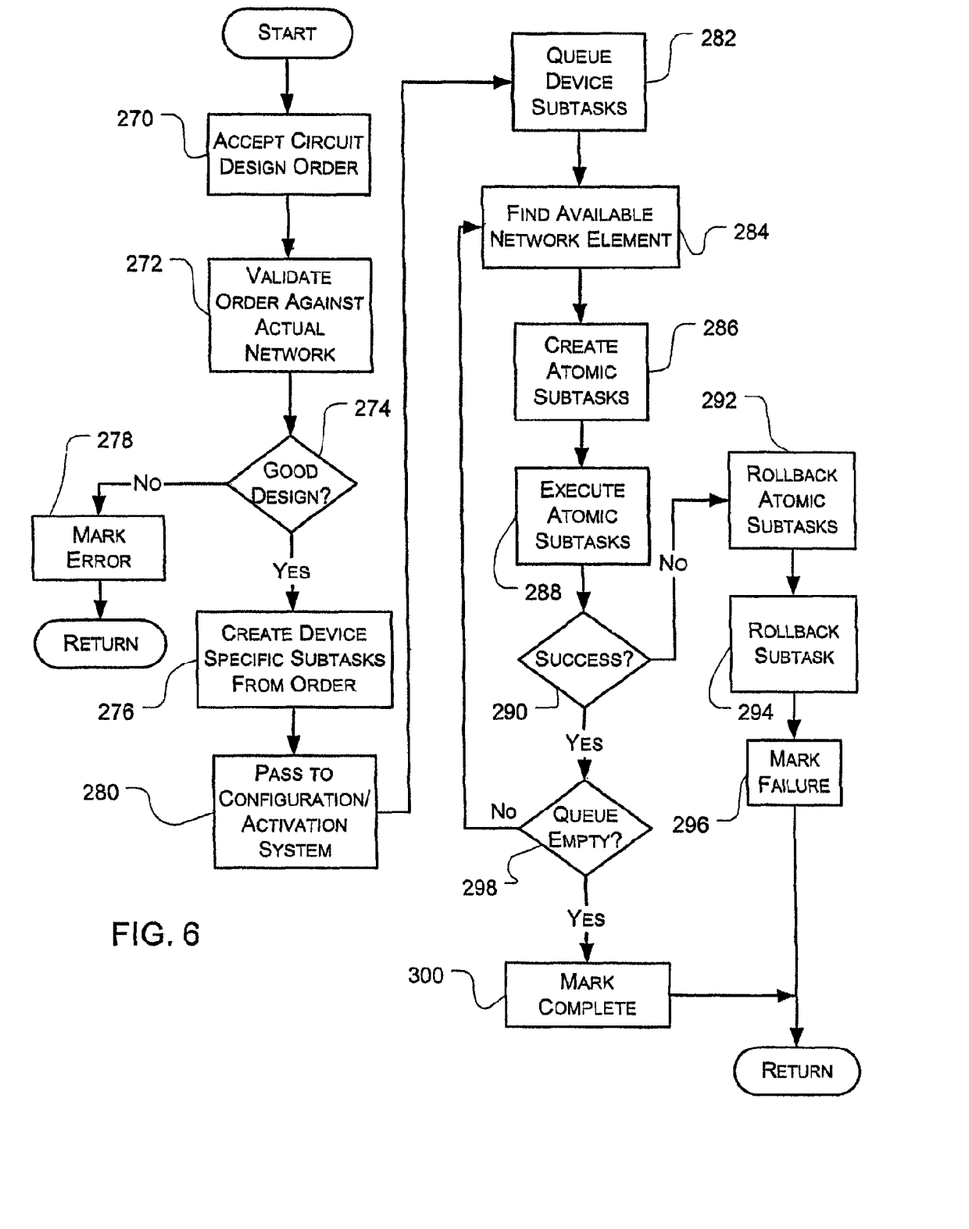
FIG. 6 shows the operational flow of one preferred embodiment of operations performed by the service management system of FIG. 5.

FIG. 6 shows an embodiment of operational modules performing the operations of the service management system 110 of FIGS. 1 and 5. The operational flow begins with accept operation 270 receiving and accepting the circuit design associated with the customer's request or order for network service. Validate operation 272 validates the ordered circuit design against an inventory of the live network. The live or actual network information for network components—network elements, ports, cross-connects, and segments—is collected by the fault/inventory system 250 (FIG. 5); it is stored as live network records in working storage in the fault/inventory system 250 and passed to the live database 252. The validate operation 272 compares the circuit design against what actually exists in the live or actual network. If all network components match design test operation 274 detects a good design and branches the operation flow YES to create subtasks operation 276. If one or more components in the circuit design do not match the live inventory, the operation flow branches NO from design test operation 274 to mark error operation 278. Mark operation 278 marks the error or errors, and operation flow exist through return back to the installation operational flow in FIG. 2, 3 or 4.

Create subtasks operation 276 creates the device specific subtasks list that must be performed to configure and active a device in the circuit design. A list of subtasks is created for the entire circuit design, and operation 280 passes the list of subtasks to queue operation 282. Because there may be multiple service requests in process the queue operation 282 places the list of subtasks from pass operation 280 into queue with other subtasks from other service requests whose subtasks are in queue. This will allow some optimization of the configuration and activation operations for the network.

When a subtask is at the top of the queue, find operation 284 finds the available network element or device that is to be configured by the subtask. With this network element or device identified as to type and properties, create atomic subtasks operation 286 creates a list of atomic tasks or instructions to be performed on that device to configure the device for activation. Execute operation 288 in the configuration system 254 executes the list of atomic tasks which are communicated to the network element or other component and performed on the element or component to configure it. Success test operation 290 tests whether the execution of the list of atomic tasks and the resulting configuration of an associated network element or component was successful.

If the configuration was not successful the operation flow branches NO to atomic rollback operation 292. Atomic rollback operation 292 rolls back through the atomic subtasks list undoing all of the tasks and undoing the configuration of the network elements or components that the atomic subtasks were operating on. Subtask rollback operation 294 rolls back through the subtasks from which the atomic subtasks were created. Lastly, mark operation 296 marks the network element or component where the failure occurred and then the operation flow returns to the installation operation flow in FIG. 2, 3 or 4.

If the configuration of the network element or device is successful, the operation flow branches from success/fail test operation 290 to queue empty detect operation 298. Queue empty detect operation 298 queries whether the queue of subtasks is empty or whether there are more subtasks to be performed. If the queue is not empty, the operation flow returns to find operation 284 to find the network element or other network component to be configured by the next subtask in the queue. If the queue is empty, the configuration and activation of the circuit design for the order is complete, and the operation flow branches YES to mark operation 300. Mark operation 300 notifies the command control engine 104, that the circuit design is configured for activation. The operation flow than returns to the installation operation flow in FIG. 2, 3 or 4.

Figure 7:
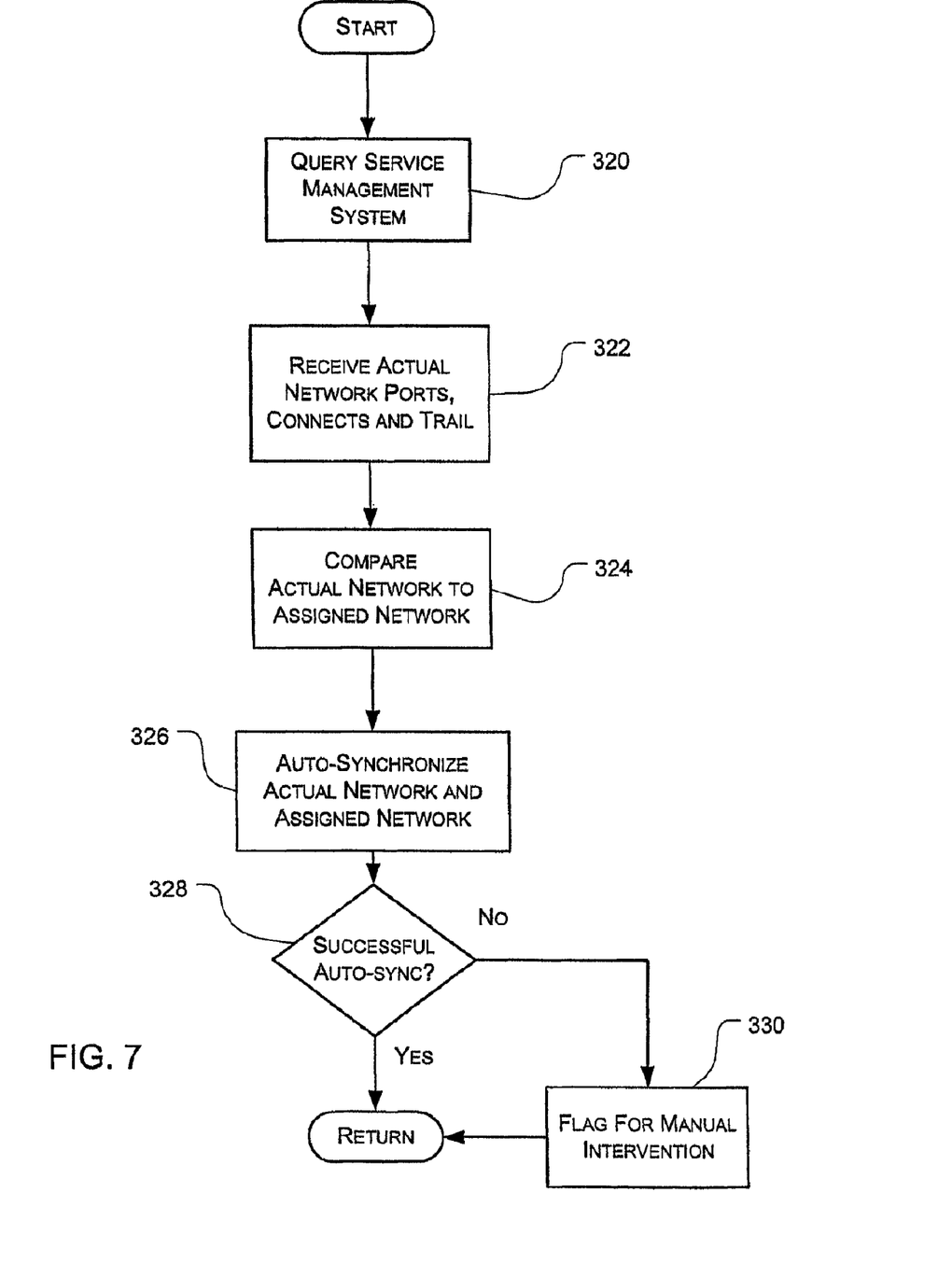
FIG. 7 shows the operational flow of one preferred embodiment of operations performed by the reconciliation system 112 of FIG. 1.

FIG. 7 illustrates the operational flow for one embodiment of the reconciliation system 112 in FIG. 1. The reconciliation operation flow begins with query operation 320. Query operation 320 retrieves the actual or live network inventory from the live inventory database 252 in the service management system 110 (FIG. 5). Receive operation 322 receives the network elements, their ports and cross-connects, the segments and all other component information for the live network from the live inventory database. Compare operation 324 takes this live inventory information and compares it against the asset inventory information in the asset database used by the provisioning system 108 (FIG. 1). In effect compare operation 324 is comparing the actual network from the live database to the asset network which only exists as data records from the asset database.

The reconciliation of the asset inventory database to the live inventory database begins with auto-synchronize operation 326. The auto-synchronize operation is described in more detail hereinafter with reference to FIG. 8. In the auto-synchronize operation each conflict between a device in the asset inventory and a device in the live inventory is fixed or flagged as a conflict for manual intervention. Further, auto-synchronize may try multiple conflict resolution plans by reassigning assets in the asset inventory. After all conflicts between the two inventories have been processed, successful auto-sync test 328 will detect whether the automatic synchronization was successful. If it was, the reconciliation operations are complete, and the operation flow returns to the main program. If the synchronization was not successful, the operation flow branches NO to post operation 330. Post operation 330 posts a notice or flag that any remaining conflicts must be handled by manual intervention and the operation flow returns to the main program.

Figure 8:
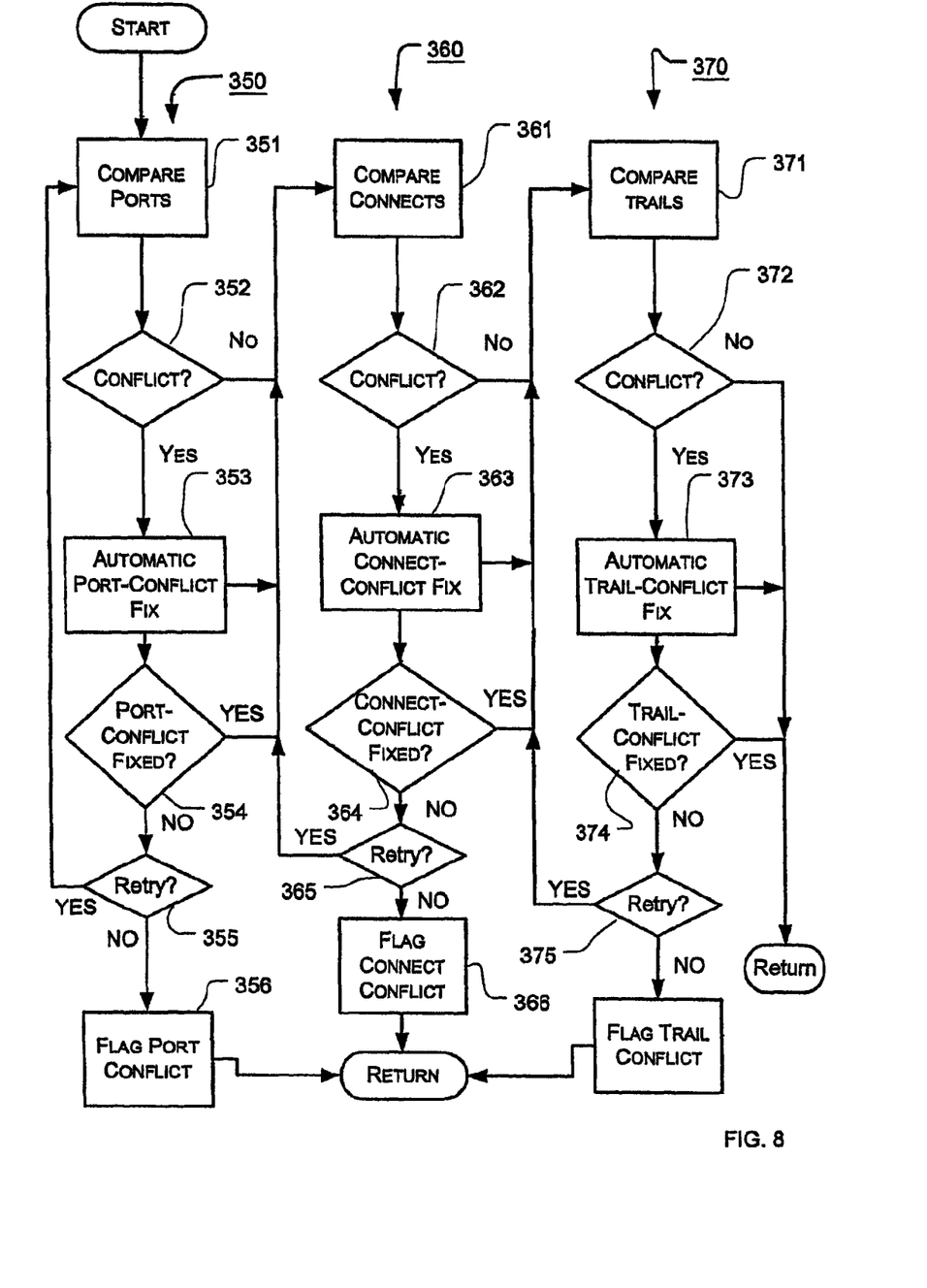
FIG. 8 shows the operational flow of one preferred embodiment of operations performed by the auto synchronize operation 326 of FIG. 7.

FIG. 8 shows the operational flow for one embodiment of the auto-synchronize operation 326 of FIG. 7. The auto-sync flow has three phases, shown in three columns in FIG. 8,—port conflict fix 350, connect conflict fix 360 and trail conflict fix 370. Port refers to the ports in network elements. Connect refers to cross-connects between ports or connects in segments. Trail refers to the entire path from end point to end point in a network service. The auto-sync works on port-conflicts first, then connect-conflicts and finally trail-conflicts. Each phase proceeds in a like manner and the like operations in each phase will be described together.

Compare operations 351, 361 and 371 compare ports, connects and trails respectively between the live network and the asset network. Conflict test operations 352, 362 and 372 detect respectively whether there is a port, connect or trail conflict found by their associated compare operations 351, 361 and 371. If there is no conflict, the operation flow proceeds to the next phase 360, 370 and lastly returns to operation flow in FIG. 7. If a conflict is detected in a phase, than that the automatic port-conflict fix 353, the automatic connect-conflict fix 363 or the automatic trail-conflict fix 373 of that phase operates to try to fix the conflict. The automated conflict fix operations are described hereinafter with reference to FIG. 9.

From each automated conflict fix operation there are two exit paths. In one path it is determined that a fix is not available so the operation flow proceeds to the next phase. In the other path, a fix is available and attempted. This path exits respectively to conflict fixed test operations 354, 364, and 374. Each conflict test operation detects whether its associated conflict fix operation was successful in resolving the conflict. If it was successful, the operation flow branches YES to the next phase or lastly returns to the operation flow in FIG. 7. If it was not successful, the operation flow branches NO to the retry operation 355, 365 and 375. If there are more choices to resolve the conflict, the choice is executed, and the operation flow returns to compare operation 351, 361 and 371. The conflict is again checked and if there is a conflict, an auto fix is attempted. If the automatic fix is not successful, and there are no more choices, the operation flow branches NO from the retry operation 355, 365, or 375 to the associated flag conflict operation—flag port conflict operation 356, flag connect conflict operation 366 or flag trail conflict operation 376. After the conflict is flagged, the operation flow returns to FIG. 7.

Figure 9:
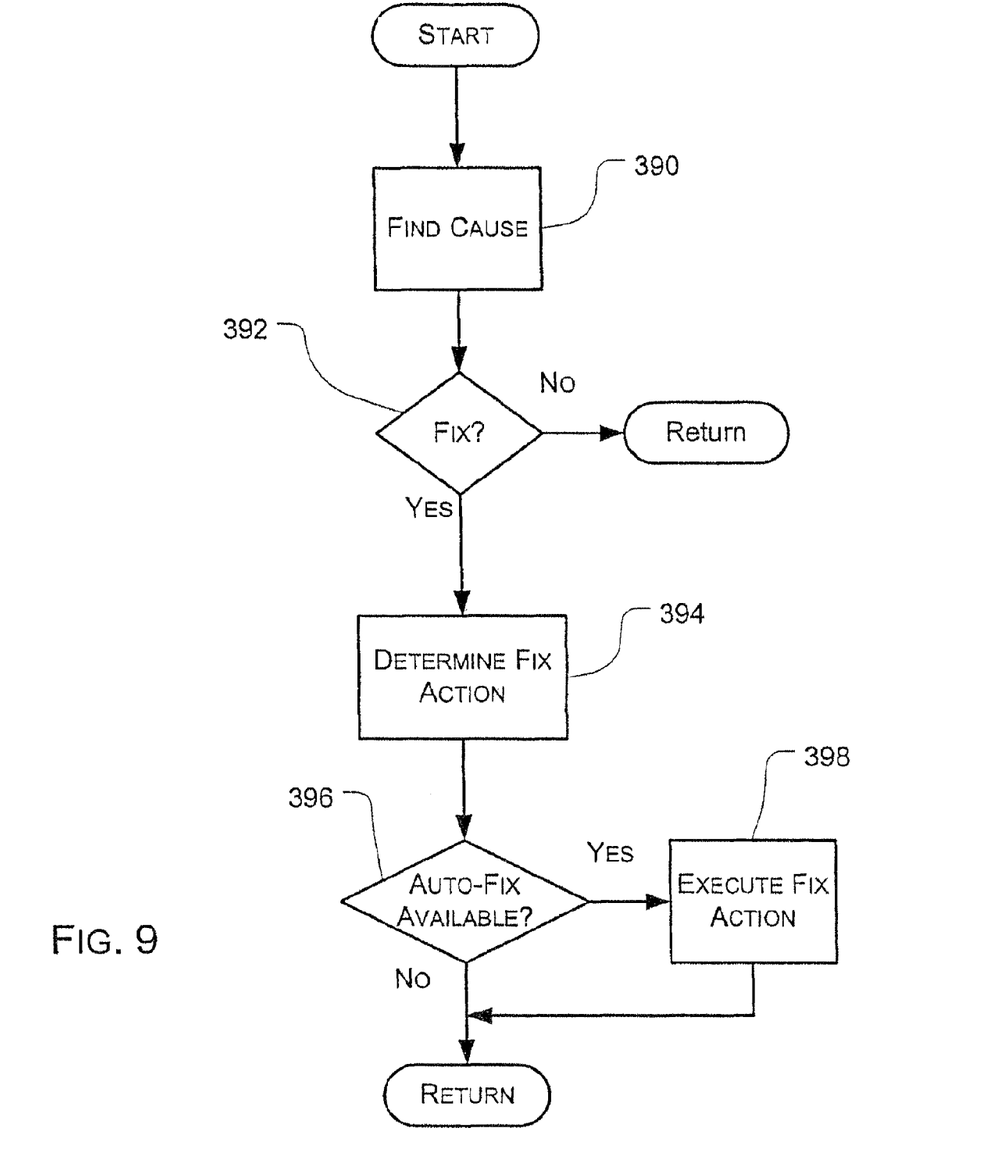
FIG. 9 shows the operational flow of one preferred embodiment of operations performed by the automatic conflict fix operations 353, 363 and 373 of FIG. 8.

FIG. 9 shows one embodiment of the operations performed by the automatic conflict fix operations 352, 362 or 372 in FIG. 8. The automatic fix flow begins at find cause operation 390 which identifies the source and cause of the conflict. Fix test operation 392 analyzes the cause and detects whether a fix is possible. If a fix is not possible, the operation flow branches NO, returns to the operational flow in FIG. 7 and proceeds to the next phase in FIG. 7. If a fix is possible, the operation flow branches YES to determine fix operation 394. Determine fix operation 394 finds the fix action appropriate to the conflict cause found by operation 390. In one embodiment a table of fix actions exists for the various possible conflict causes. Determine fix operation 394 than looks-up in the table the appropriate fix action. In another embodiment the fix action might be a set of rules to be used in creating a fix action for different types of conflict causes.

Auto-fix available test operation 396 detects whether determine fix operation 394 has found a fix action. If it has not, the operation flow branches NO and returns to a conflict fixed test operation in FIG. 8. If a fix action was found or created, the operation flow branches YES to execute operation 398. Execute fix operation 398 runs the fix action in an effort to resolve the conflict. After the execute operation, the operation flow again returns to a conflict fixed test operation in FIG. 8.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for installing a telecommunications service in a network, the method comprising computer-implemented acts of:

receiving a circuit design of a plurality of components in the network;

analyzing the circuit design against status information concerning the plurality of components;

if the circuit design is valid, then:

creating a list of subtasks to be executed in association with at least two components in the circuit design;

arranging each of the subtasks in the list in a relative order in a queue;

accessing the queue in accordance with the relative order to retrieve a particular subtask associated with a particular component of the at least two components and executing the particular subtask to create configuration instructions for the particular component;

initiating configuration of the particular component in accordance with the configuration instructions;

determining whether configuration of the particular component was successful, and if so, repeating the accessing and the initiating acts for each of the other subtasks remaining in the queue in order to configure each of other components of the at least two components for use in provisioning the telecommunications service based on the valid circuit design; and if the circuit design is not valid, indicating that the circuit design has an error.

2. A method as recited in claim 1, wherein the initiating act comprises:

transmitting configuration instructions to the plurality of components via an element management system.

3. A method as recited in claim 1, wherein the initiating act comprises:

transmitting the configuration instructions associated with the at least two components to the at least two components via a direct connection selected from the group consisting of: serial communication interface and an Internet Protocol interface.

4. A method as recited in claim 1, wherein the telecommunications service comprises a private line.

5. A method as recited in claim 1, wherein the telecommunications service comprises a wavelengths service.

6. A method as recited in claim 1, wherein the plurality of components comprises components selected from the group consisting of: cross-connects, device ports and network segments.

7. A method as recited in claim 1, wherein the indicating act comprises:

marking at least one of the plurality of components as unavailable for subsequent circuit designs.

* * * * *